E. P. JOSLYN.
Wagon-Gear.
No. 221,236.   Patented Nov. 4, 1879.
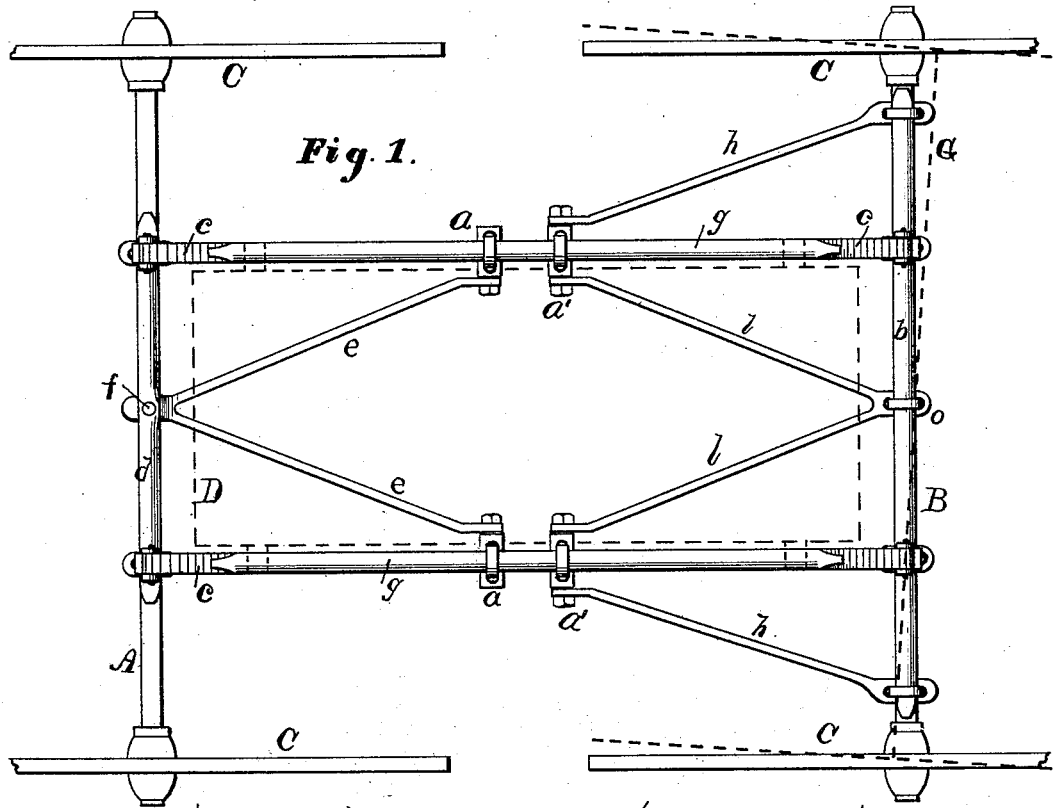
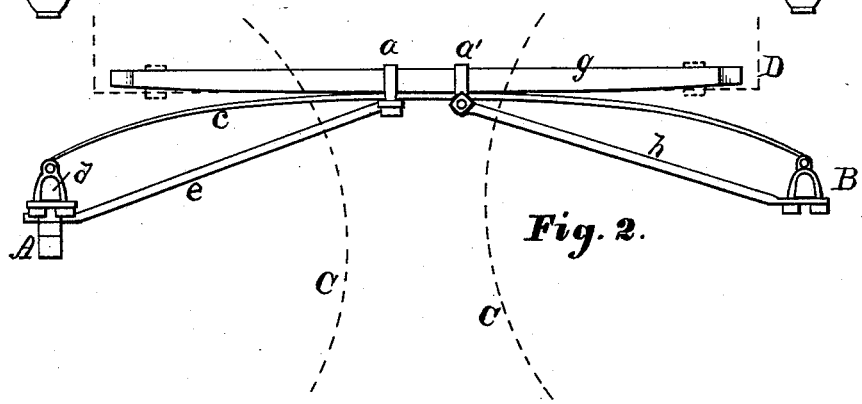
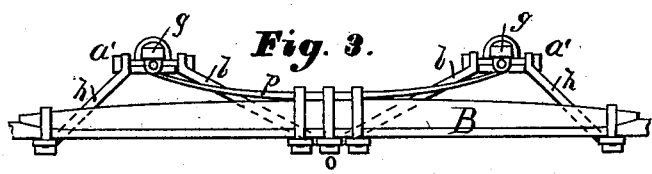
Attest:
Alex. Ross
A. P. Ely
Inventor:
E. P. Joslyn
By E. B. Whitmore, Atty.

UNITED STATES PATENT OFFICE.

ELIAS P. JOSLYN, OF BROCKPORT, NEW YORK.

IMPROVEMENT IN WAGON-GEARS.

Specification forming part of Letters Patent No. 221,236, dated November 4, 1879; application filed October 6, 1879.

*To all whom it may concern:*

Be it known that I, ELIAS P. JOSLYN, of Brockport, in the county of Monroe and State of New York, have invented a new and useful Improvement in Gears for Light Wagons, which improvement is fully set forth in the following specification and accompanying drawings, in which—

Figure 1 is a plan; Fig. 2, a side elevation, and Fig. 3 a modification.

My invention relates to buggies and other light road and track wagons; and it consists, mainly, in employing a system of braces under the body, by means of which the rear axle is kept parallel with the head-block, causing the rear wheels to track properly after the forward wheels, and preventing the body from side swaying while passing over rough roads.

In the drawings, A is the front axle, B the rear axle, and C the wheels, of an ordinary light wagon. The rear axle is provided with the usual wooden stock $b$, and $d$ is a head-block, of usual form, provided with a king-bolt, $f$, securing it to the axle A.

$c\ c$ are flat longitudinal perch-springs, of suitable form and dimensions, fastened with ordinary couplings at their ends, respectively, to the rear axle, B, and head-block $d$. $g\ g$ are parallel horizontal side bars, lying upon the springs $c\ c$, from which to suspend the body D, (represented in dotted lines,) the said side bars being held to the springs by means of ordinary clips $a\ a$ and $a'\ a'$, as shown. Oblique braces $e\ e$ extend from the clips $a\ a$ of the side bars to the front axle, uniting at the king-bolt $f$, and similar braces $l\ l$ reach from the clips $a'\ a'$ to the middle of the rear axle, being held to the same by a clip, $o$. $h\ h$ are similar exterior separate braces, connecting the clips $a'\ a'$ with the rear axle at points near the hubs of the wheels, the ordinary perch or reach connecting the axles being dispensed with.

Wagon-gears with braces $e\ e$ and $h\ h$ have heretofore been used, to which I lay no claim; but such gears have been found in practice to be objectionable and the braces insufficient, for if, for instance, the right-hand side of the vehicle were the more heavily loaded, the spring $c$ on that side would be partially straightened or expanded, causing the rear axle to be forced back into an oblique position, as represented by the dotted line G, thus throwing the rear wheels off of their course, as shown, causing them to track badly, and resulting in a serious and unnecessary strain upon the wheels and rear axle, and placing an additional resistance upon the draft of the horse. The braces $h\ h$ and $e\ e$ are also incapable, unassisted, of preventing a serious side sway to the body when the wheels of either side pass over an obstacle in the road, or when they are running upon lower ground than the others.

To overcome these difficulties I introduce the additional interior oblique braces, $l\ l$, attached to the center of the rear axle, and to the same clips, $a'\ a'$, to which the braces $h\ h$ are connected, thus, with said braces $h\ h$ and axle, forming two rigid triangles, constituting, in fact, a miniature bridge-truss possessing great strength and stiffness.

It will be observed with this system of braces that were the right-side spring, for instance, more heavily loaded than the other, the resulting backward pressure would be conducted through the brace $h$ and the brace $l$, connected with the said spring, equally to the middle and right end of the rear axle. This backward pressure upon the middle of the axle would result in an immediate pull upon the left interior brace, $l$, which, in turn, would cause a backward thrust along the left exterior brace, $h$, being delivered upon the left end of the axle. The action of these braces, when arranged as shown, is to distribute any lateral backward thrust caused by a load placed anywhere within the body D evenly over the whole rear axle, the said braces and axle corresponding to the diagonal struts and bottom chord, respectively, of a bridge-girder.

When thus braced the rear axle will move backward in parallel positions as either or both springs are loaded, causing the rear wheels to follow squarely after the forward wheels. The same rear diagonal braces $l\ l\ h\ h$, forming, with the axle, rigid triangles, effectually prevent any lateral or side swaying of the body, as will readily be understood from inspection, the motions of the body caused by jolting being vertical upon the springs.

Fig. 3 shows a portion of the rear axle with an end spring, $p$, resting upon said axle, supporting the ends of the side bars, $g\ g$, which may be used in connection with the braces $l\ l$ $h\ h$, omitting the side springs, or using only short ones, connected by cross-springs, upon which to rest the body. The sills of the body may also be placed directly upon the perch-springs $c$, being clipped thereto by the clips $a\ a\ a'\ a'$, the same as the side bars shown, said bars being omitted.

I claim as my invention—

1. The combination, with the axle B, springs $c\ c$, bars or sills $g\ g$, and fastenings $a'\ a'$, of the braces $l\ l$, substantially as described.

2. In light wagons, the combination of four braces, $h\ h\ l\ l$, together with the axle, forming two rigid triangles, substantially as and for the purpose set forth.

E. P. JOSLYN.

Witnesses:
E. B. WHITMORE,
HENRY E. WHITE.